United States Patent [19]

Sato

[11] Patent Number: 5,268,777
[45] Date of Patent: Dec. 7, 1993

[54] DRIVING METHOD OF ACTIVE MATRIX DISPLAY HAVING FERROELECTRIC LAYER AS ACTIVE LAYER

[75] Inventor: Takashi Sato, Nagano, Japan

[73] Assignee: Seiko Epson Corporation, Tokyo, Japan

[21] Appl. No.: 773,749

[22] Filed: Oct. 10, 1991

Related U.S. Application Data

[63] Continuation of Ser. No. 288,312, Dec. 22, 1988, abandoned.

[30] Foreign Application Priority Data

Dec. 23, 1987 [JP] Japan ............................. 62-325696
Sep. 1, 1988 [JP] Japan ............................. 63-219106

[51] Int. Cl.[5] ......................... G02F 1/133; G09G 3/36
[52] U.S. Cl. ........................................ 359/57; 359/58; 359/74; 345/87
[58] Field of Search ............ 350/333, 336, 334, 339 R, 350/350 S; 340/784, 765; 359/55, 56, 57, 86, 74

[56] References Cited

U.S. PATENT DOCUMENTS

| | | | |
|---|---|---|---|
| 3,725,899 | 4/1973 | Greubel | 350/339 R |
| 4,021,798 | 5/1977 | Kojima et al. | 350/336 |
| 4,040,720 | 8/1977 | York | 350/339 R |
| 4,051,465 | 9/1977 | Brody | 340/784 |
| 4,572,615 | 2/1986 | Nickol et al. | 350/334 |
| 4,630,893 | 12/1986 | Credelle et al. | 350/334 |
| 4,725,129 | 2/1988 | Kondo et al. | 350/350 |
| 4,790,631 | 12/1988 | Yamazaki | 350/350 |
| 4,840,462 | 6/1989 | Hartmann | 359/56 |
| 4,850,680 | 7/1989 | Yamazaki et al. | 350/339 R |
| 4,944,575 | 7/1990 | Aigrain et al. | 350/350 S |
| 4,978,203 | 12/1990 | Yamazaki et al. | 350/350 S |
| 4,995,706 | 2/1991 | Inujima et al. | 350/336 |

FOREIGN PATENT DOCUMENTS

| | | |
|---|---|---|
| 0246945 | 11/1987 | European Pat. Off. . |
| 0248471 | 12/1987 | European Pat. Off. . |
| 0320054 | 6/1989 | European Pat. Off. . |
| 0321962 | 6/1989 | European Pat. Off. . |
| 0155795 | 12/1979 | Japan ................... 359/56 |

OTHER PUBLICATIONS

D. Castleberry "Control Layers for Liquid Crystal Matrix Display" 1980 Biennial Display Research Conference TEEE Oct. 1980—pp. 89-92.
G. Grabmaier, et al., Liquid Crystal Matrix Displays Using Additional Solid Layers for Suppression of Parasite Currents, *Molecular Crystals and Liquid Crystals*, vol. 15, 1971, pp. 95-104.
L. E. Tannas, et al., Matrix Addressed Liquid Crystal/Ferroelectric Display, SID 73, May 15, 1983, p. 178.

*Primary Examiner*—William L. Sikes
*Assistant Examiner*—Tai V. Duong
*Attorney, Agent, or Firm*—Blum Kaplan

[57] ABSTRACT

An active element on an insulating substrate of an electro-optical display device includes a layer of ferroelectric material as an active layer between two electrodes for each pixel in the display. The active device includes a first electrode formed on an insulating substrate, the ferroelectric layer covering the first electrode and the insulating substrate, and the second electrode disposed on the ferroelectric layer for overlapping a portion of the first electrode with the ferroelectric material therebetween. Preferably, the ferroelectric material is an organic ferroelectric material.

8 Claims, 15 Drawing Sheets

FIG. 15
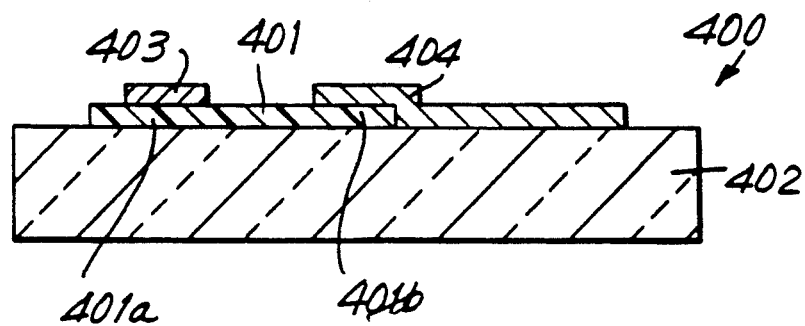
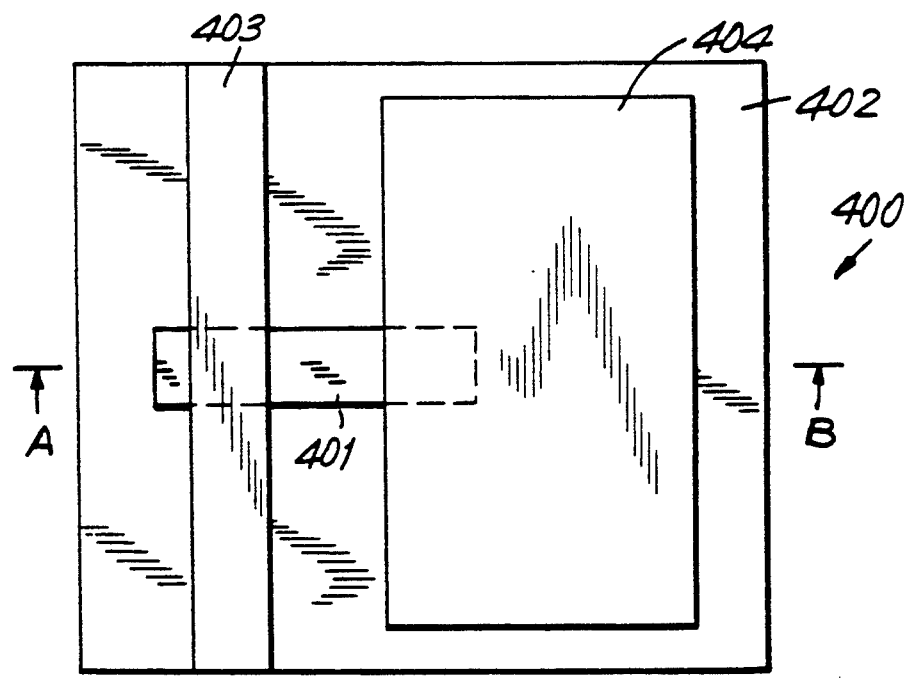
FIG. 16

FIG. 22
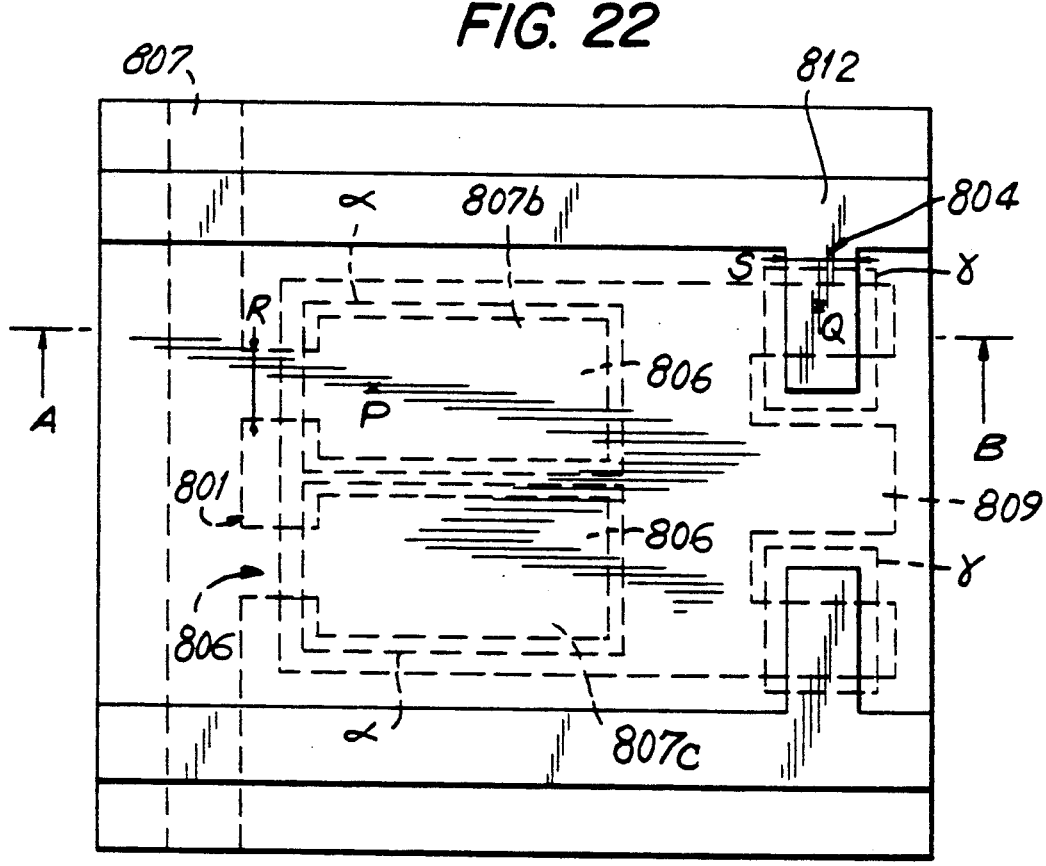
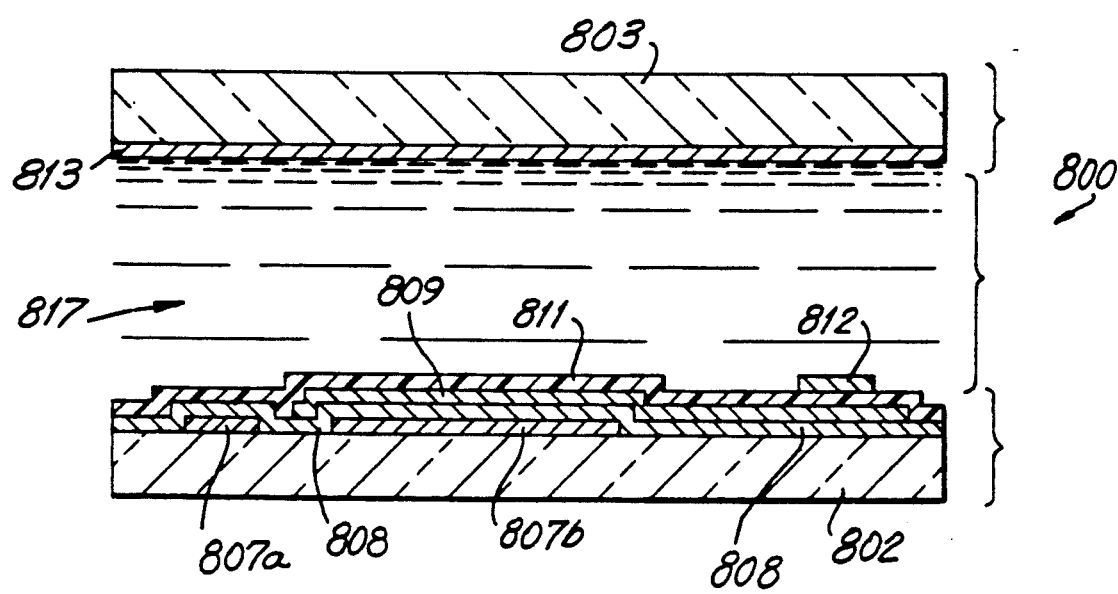
FIG. 23

DRIVING METHOD OF ACTIVE MATRIX DISPLAY HAVING FERROELECTRIC LAYER AS ACTIVE LAYER

This is a continuation of application Ser. No. 07/288,312, filed Dec. 22, 1988, now abandoned.

BACKGROUND OF THE INVENTION

This invention relates generally to an active device used for an active nature to display and a printer engine of a printer, an active matrix display and method of joining the active matrix display.

A prior art active device is described in SID (Society for Information Display) Symposium Digest of Technical Papers, Vol. XVI, pages 296–97 (1986) and is shown in FIG. 1 generally as 101. Liquid crystal display panel 101 includes a lower substrate 102 having a thin film transistor 103 thereon with a pixel or display electrode 104 connected thereto. An upper opposed glass substrate 106 has a transparent electrode 107 deposited thereon and a liquid crystal 108 is disposed between substrates 102 and 106. Thin film transistor 103 is formed by depositing a gate electrode 109 on substrate 102, forming a gate insulation film 111 across substrate 102, depositing an amorphous Si channel region 112 and forming a source region 113 and a drain region 114 in the region above gate electrode 109. A source electrode 116 and a drain electrode 117 are formed and coupled to source region 113 and drain region 114 respectively and drain electrode 117 is coupled to pixel electrode 104.

Conventional liquid crystal display panel 101 has several disadvantages. Pixel information that is a data electric voltage applied to source electrode 116 is transmitted to liquid crystal material 108 between pixel electrode 104 and opposed electrode 107 through amorphous Si channel region 112 which is turned on and off by gate electrode 109. Thus, a data electric voltage is held by a charged amount of liquid crystal material 108. However, the charge in liquid crystal material 108 is reduced as time passes due to leakage of current through thin film transistor 103. In other words, the data electric voltage is lost as time passes. Thus, a clear picture image with sharp contrast is difficult to obtain.

It is also difficult to produce an active device having uniform properties over a large area substrate due to difficulties in the complex manufacturing process. Additionally, the conventional active matrix devices have a complex construction which requires a difficult and long manufacturing process. This results in low yield of devices at high cost. An active matrix display including such active elements encounter the same difficulties in manufacture and loss of contrast.

Accordingly, it is desirable to provide an improved active device, an active matrix display including the improved active devices and a driving method for driving the active matrix display which eliminates these problems associated with prior art devices and provides a clear picture image with sharp contrast at low cost.

SUMMARY OF THE INVENTION

Generally speaking, in accordance with the invention, an improved active device and an active matrix display including the active device including a ferroelectric layer deposited on an insulation layer for non-linearly electrically connecting at least two electrodes and acting as an active layer is provided. The active device includes a first electrode on an insulating substrate and a ferroelectric layer covering the first electrode and the insulating substrate. A second electrode is disposed on the ferroelectric layer overlapping a portion of the first electrode with the ferroelectric material therebetween. An active matrix display is formed by arranging a plurality of active devices on the substrate in a matrix array and coupling each active device to a corresponding display electrode. The ferroelectric material is preferably an organic ferroelectric material An active matrix display containing a material having an electro-optical effect arranged in accordance with the invention is driven by applying a selection voltage $\pm V_0$ to a group of selection lines, during respective field periods, and applying a data voltage $\pm V_1$ to a group of data lines. The absolute value of $V_0 - V_1$ satisfies the relationship:

$$C_{CL}/(C_{CL}+C_F)|V_0-V_1| > E_C d_F$$

where:

$E_C$ is the coercive electric field of the ferroelectric layer;

$d_F$ is the film thickness of the ferroelectric layer;

$C_F$ is the capacity of the active layer in the ferroelectric layer per pixel; and $C_{LC}$ is the capacity of material having an electro-optical effect per pixel.

Accordingly, it is an object of the invention to provide an improved active element including a ferroelectric layer between electrodes.

It is another object of the invention to provide an improved active matrix display containing a material having an electro-optical effect which includes a matrix of the active elements.

It is a further object of the invention to provide a method of preparation of the active devices having uniform properties over a large area.

Still another object of the invention is to provide a method for driving a active matrix display which includes the improved active devices prepared in accordance with the invention.

Still other objects and advantages of the invention will, in part, be obvious and will in part be apparent from the specification.

The invention accordingly comprises the several steps and the relation of one of more such steps with respect to each of the others, and the apparatus embodying features of construction, combinations of elements, an arrangement of parts which are adopted to effect such steps, all as exemplified in the following detailed disclosure, and the scope of the invention will be indicated in the

BRIEF DESCRIPTION OF DRAWINGS

For a fuller understanding of the invention, reference is had to the following description taken in connection with the accompanying drawings, in which:

FIG. 15 is a cross-sectional view of an active device prepared in accordance with another embodiment of the invention;

FIG. 16 is a plan view of the active device of FIG. 15;

FIG. 22 is a plan view of a pixel of a liquid crystal display panel using the active device prepared in accordance with the first embodiment of the invention; and FIG. 23 is a cross-sectional view of the liquid crystal display panel of FIG. 22.

DESCRIPTION OF PREFERRED EMBODIMENTS

Figure 1:
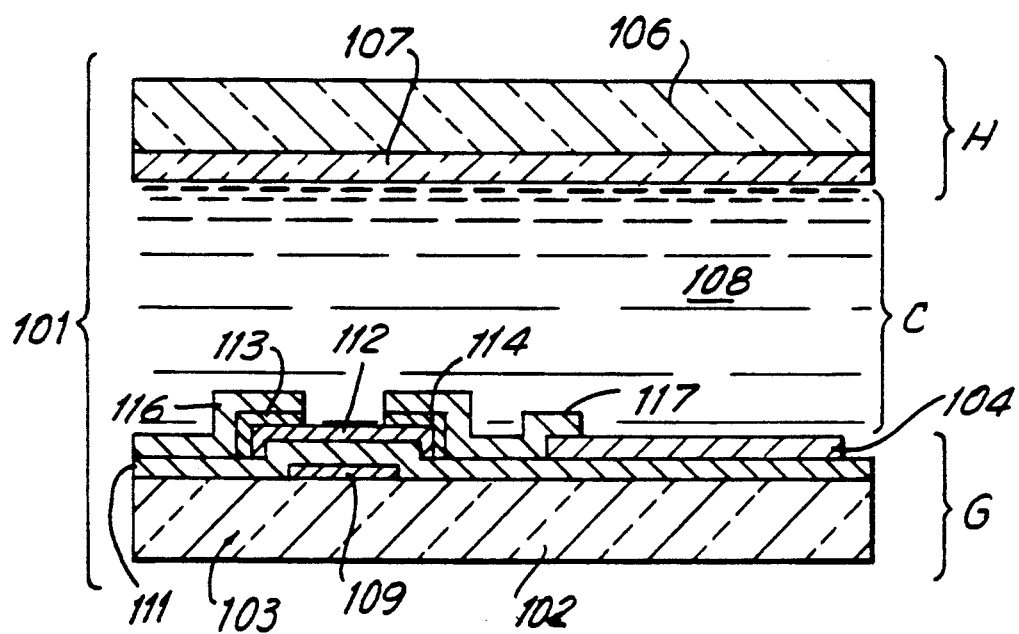
FIG. 1 is a cross-sectional view of a prior art active device.
Figure 2:
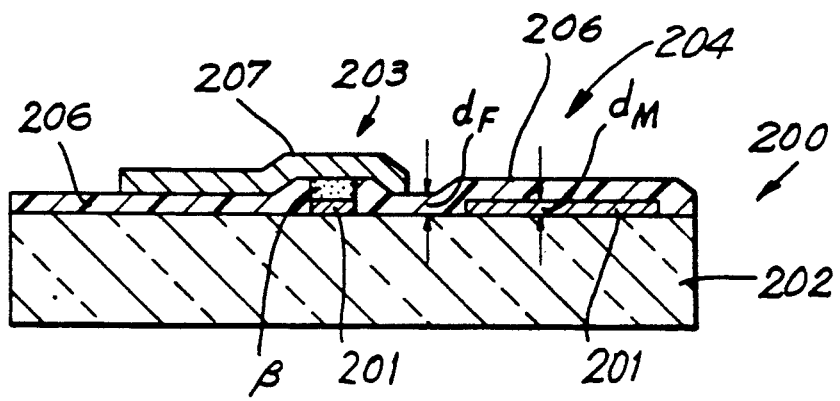
FIG. 2 is a cross-sectional view of an active device constructed and arranged in accordance with the invention.
Figure 3:
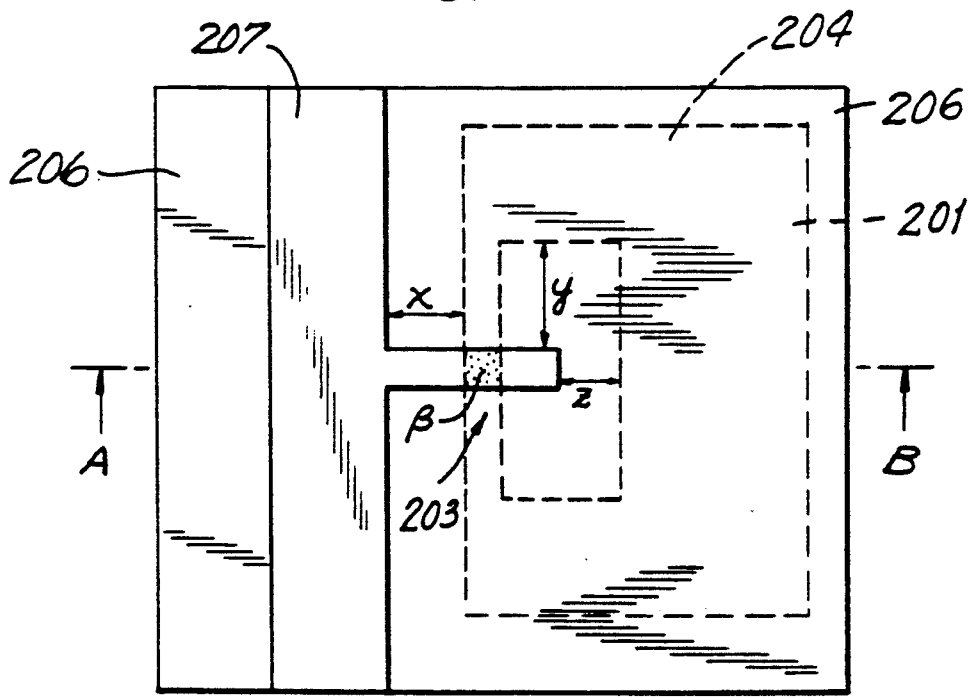
FIG. 3 is a plan view of the active device of FIG. 2.

Arrangement of the elements of an active device 200 including an associated electro-optical electrode 204 constructed and arranged in accordance with the invention is shown in FIGS. 2 and 3. FIG. 2 is a cross-sectional view taken along line A–B of the plan view of FIG. 3. Active device 200 includes a first electrode layer 201 of ITO deposited on an insulating glass substrate 202 for forming an active element segment 203 and an electro-optical electrode 204. A layer of ferroelectric material 206 is deposited on first electrode layer 201 and substrate 202. Ferroelectric layer 206 is a copolymer of vinylidene fluoride (VDF) and trifluoroethylene (TrFE). A second electrode layer 207 of Cr is deposited on ferroelectric layer 206. Two photoresist processing steps are necessary for the formation of active device 200 as described.

In FIG. 2 a film thickness $d_F$ of ferroelectric layer 206 between first electrode layer 201 and second electrode layer 207 is less than dimensions x, y, z between first electrode layer 201 and second electrode layer 207 in a direction parallel to the upper surface of substrate 202. Thus, when voltages are applied to first electrode layer 201 and second electrode layer 207 to invert spontaneous polarizations of ferroelectric material 206 disposed between electrodes 203 and 207, it is possible to set the voltage so that only the polarizations in direction $d_F$, which has a smaller dimension than intervals x, y and z, are inverted. Inversion will not occur in the directions shown by arrows x, y and z. When dimensions $d_F$ x, y and z and the voltages are set as described above, polarization is restricted to a region B of ferroelectric layer 206 of active device 200 in FIG. 2.

The active region of ferroelectric layer 206 is restricted to region $\beta$ where electrode layers 201 and 207 overlap or the region where electrodes 201 and 207 are opposed to each other with ferroelectric material 206 therebetween. When only region $\beta$ works as the active layer are the following results obtained. First, since the spontaneous polarization of ferroelectric layer 206 in the x, y, and z directions are not inverted in the construction of FIGS. 2 and 3, there is no crosstalk between adjacent elements a plurality of active devices 200 are used in an active matrix display. As a result of this, an electro-optical display of high quality can be provided. Second, since capacitances produced in the x, y, and z directions can be reduced to less than the capacitance in the $d_F$ direction, the total capacitance of ferroelectric layer 206 between electrodes 203 and 207 is smaller. As described below, this results in improved image quality of the active matrix display while also reducing the driving voltage and preventing a crosstalk effect and the like.

Since VDF and TrFE copolymer used for ferroelectric layer 206 exists in a liquid phase and is soluble in solvents including dioxane or methyl ethyl ketone, it can easily be formed uniformly over large areas by a spin-coat method. This illustrates why a uniform active device can easily be formed over a large area of an insulating substrate. Thus, an active matrix display which has a uniform display image over a large area can be achieved. Ferroelectric layer 206 of a VDF and TrFE copolymer can be formed by baking it after it is deposited by spin-coating. Since a VDF and TrFE copolymer is colorless and transparent, at least when it is deposited as a thin film, it has a high transmittance ratio of light when it is applied to a light-receiving type display. This is also particularly true in a light-transmitting type display, whereby a bright display with excellent contrast can be obtained Ferroelectric layer 206 of VDF and TrFE copolymer, has a film thickness $d_F$ which is thicker than the film thickness $d_M$ of first electrode layer 201. After substrate 202 is coated with ferroelectric layer 206 by spin-coating, substrate 202 is held horizontal for ten seconds to several minutes to insure that the surface of ferroelectric layer 206 will be flat. At this time a relationship $d_F > d_M$ can be satisfied easily by the addition of VDF and TrFE dissolved in a solvent (with appropriate adjustment of viscosity) and optimization of an r.p.m. and a time of a spin coated to form ferroelectric layer 206 with a uniform film thickness and film quality over a large area substrate. This is a significant improvement over the prior art techniques so that an active device which has good uniformity and less dispersion over a large area substrate can be formed. Further, since ferroelectric layer 206 is formed from a liquid, a process for forming ferroelectric layer 206 through coating makes the unevenness formed by electrode 201 flat and the surface of ferroelectric 206 can be made substantially flat. Since first electrode layer 201 is formed on the flat surface of substrate 202, it yields a uniform good cross-section so that second electrode layer 207 does not crack at stepped portions. Additionally, ferroelectric layer 206 also does not crack at the stepped portions after application of strong electric fields whereby a reliable active device can be obtained. It is preferable that first electrode layer 201 have a film thickness of between about 100 Å and 3000 Å and that ferroelectric layer 206 have a film thickness between about 1000 Å and 3000 Å thicker than the first electrode layer 201.

However, the positional relationship between first electrode layer 201 and second electrode layer 207 may be reversed. In this case first electrode layer 207 including active element segment 203 and display electrode segment 204 will be formed on ferroelectric layer 206. In the embodiment illustrated in FIGS. 2 and 3, first electrode layer 201, ferroelectric layer 206, and second electrode 207 are formed in order on substrate 202. The active device having the arrangement shown in FIGS. 2 and 3 with tolerances (in x, y, z directions) allow for correction of an alignment error in the photoresist process steps between first electrode layer 201 and second electrode layer 207 to provide an improved device.

Figure 4:
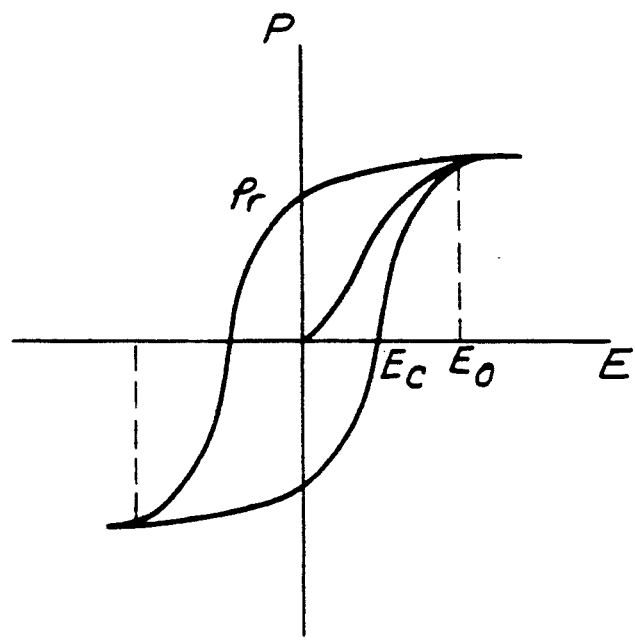
FIG. 4 is a hysteresis curve of a ferroelectric material.

FIG. 4 illustrates the operation of active device 200 in accordance with the invention. FIG. 4 is a hysteresis curve of a ferroelectric material. $P_r$ denotes remanent polarization, which is a surface charge density remaining on the surface of ferroelectric layer 206 after an applied electric field is cut off. It is known that the surface charge density has the property as a memory.

Figure 5A:
FIGS. 5a, 5b and 5c illustrate the arrangement of spontaneous polarizations in the ferroelectric material.

FIG. 5a shows an arrangement of spontaneous polarizations in various conditions. Positive surface charges are held to the opposite surface of ferroelectric layer 206 to which the arrows are directed and negative surface charges are held on the reverse thereof. When an electric field sufficiently large to invert the spontaneous polarization or an electric field larger than a coercive electric field $E_C$ is applied externally, spontaneous polarization is inverted to take an arrangement shown in FIG. 5b. At this time, the polarity of the charge held on the surface of ferroelectric layer 206 is inverted. Additionally, when a coercive electric field is applied and ferroelectric layer 206 is not a single crystal, the state of respective spontaneous polarization arranged up and down at random is maintained after the electric field is cut off. The surface charge of the ferroelectric material is zero at that time.

When an electro-optical material, such as a liquid crystal material is connected in series or in parallel to a ferroelectric material, a voltage proportional to the surface charge density of the ferroelectric material is applied to the electro-optical material. The voltage will be an AC voltage with the polarity being changed by reversing the spontaneous polarization of the ferroelectric material. It is also possible to change the surface charge density by controlling the voltage applied to the ferroelectric material, whereby the voltage applied to the electro-optical material can be controlled. Better control of the voltage applied to the electro-optical material is possible where the ferroelectric material is not a single crystal.

The voltage applied to the electro-optical material or liquid crystal originated from the surface charge of the memory property of the ferroelectric material utilized in accordance with the invention. Thus, a voltage written to the liquid crystal or other material will not be lost due to current leakage of the active device itself.

Figure 6:
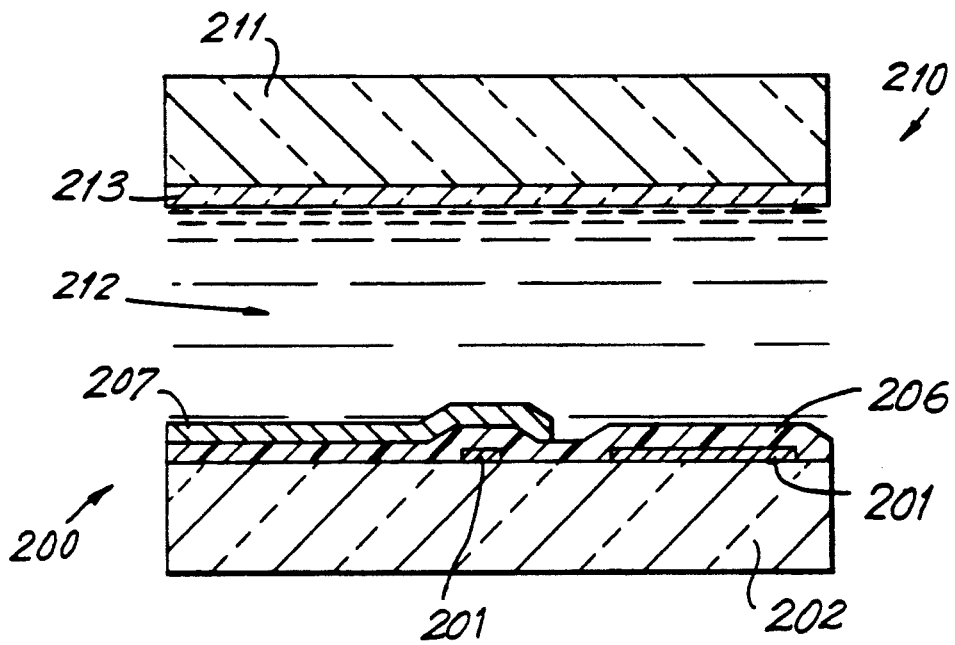
FIG. 6 is a cross-sectional view of a liquid crystal display panel constructed and arranged in accordance with the invention.

FIG. 6 is a cross-sectional view of a liquid crystal display panel 210 using active element devices 200.

Liquid crystal panel 210 includes active substrate 202 and an opposed transparent insulating substrate 211 and a liquid crystal material 212 held between active substrate 202 and substrate 211. Substrate 202 includes first electrode layer 201 of ITO, ferroelectric layer 206 of VDF and TrFE copolymer, and second electrode 207 of Cr. Upper substrate 211 is glass and includes a transparent ITO electrode 213 formed thereon.

In the display panel illustrated in FIG. 6, different materials can be used in place of liquid crystal material 212. For example, a material having an electro-optical effect such as an EL material, a gas and electrochromic material or the like may be substituted for liquid crystal material 212. The optical transmittance, light-emitting and non-light-emitting state and the color of the materials can be changed by the applied electric field.

Figure 7:
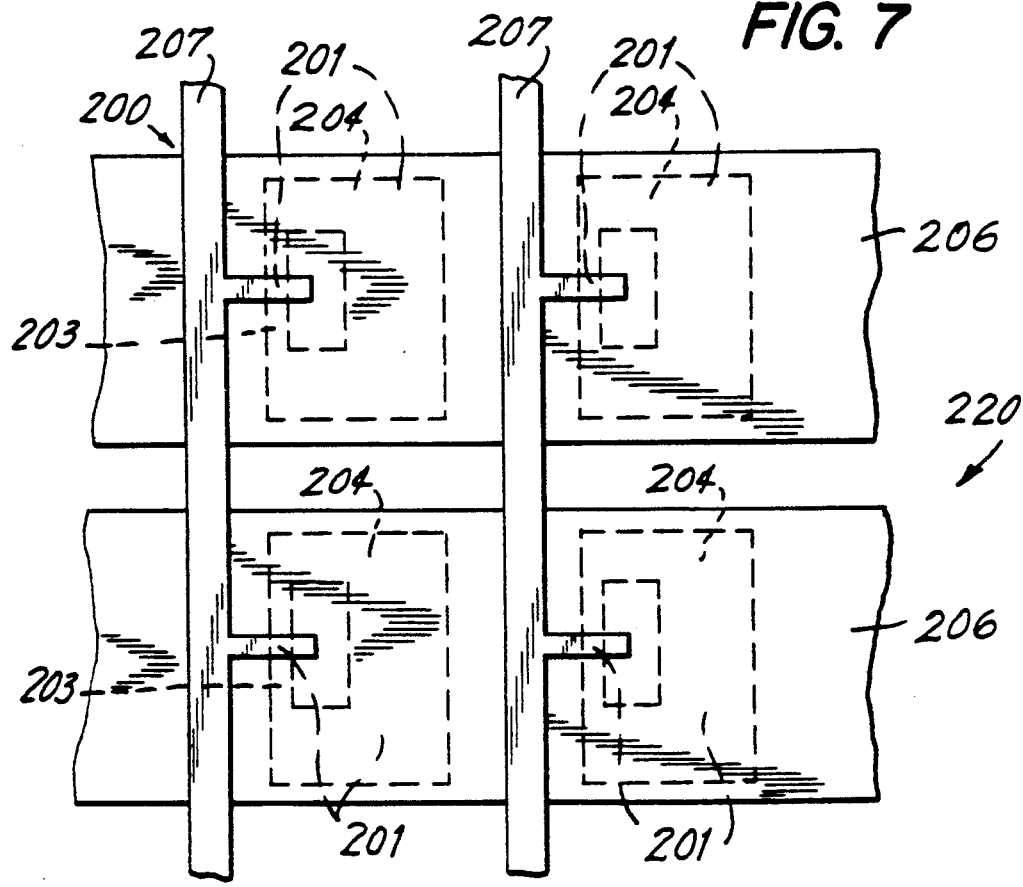
FIG. 7 is a plan view of a segment of an active matrix display prepared in accordance with the invention.

Liquid crystal panel 210 include active devices 200 is an active-type liquid crystal panel. Therefore, an active device arranged in accordance with the invention is particularly effective when the liquid crystal included is one without a memory effect by itself, such as a TN (twisted nematic type) liquid crystal, a guest-host type liquid crystal, a STN liquid crystal, a NTN liquid crystal or a homeotropic type liquid crystal or a non-smectic liquid crystal. FIG. 7 is a plan view of a portion of an active matrix display 220 including active devices 200 as previously described. Active matrix display 220 is assembled from an active matrix substrate with active elements 200 arranged in a matrix of columns and rows with second chromium electrode layer 207 forming a voltage line to each adjacent column of first electrodes 201 and display electrode portions 204. Opposed transparent substrate 211 includes cooperating transparent row common electrodes which overlap a row of active element 200. A liquid crystal material is disposed in the space between lower substrate 202 and upper substrate 211. Although ferroelectric layer 206 is disposed on and overlaps first electrode layer 201 which includes display electrode portion 204, first electrode 201 working well as a pixel electrode and produces a bright and clear display with a sharp image, because the VDF and TrFE copolymer is colorless and transparent.

Ferroelectric layer 206, which has a polarization effect, can be used as an alignment layer in a liquid crystal display after rubbing the surface of ferroelectric layer 206. It is possible to align the liquid crystal without the formation of an additional alignment layer, such as polyimide over the active substrate. Therefore, the process of assembling a liquid crystal display can be simplified and the active device will have a high throughput and it can be produced economically with high yield. Ferroelectric layer 206 is not adversely affected by a rubbing process and also serves as an insulation layer for preventing a DC voltage from being applied directly to the liquid crystal material. As described above, the active matrix display constructed and arranged in accordance with the invention can be made at low cost with a high yield and without the need for forming an alignment layer or by the use of a special process for forming an insulation film for cutting off a DC voltage. However, an organic film, such as a polyimide or the like, or an evaporated inclined $SiO_2$ film may be used as the alignment layer for upper substrate 211.

Spacers in the shape of cylinders or spheres made of plastic or glass materials can be used to maintain the gap distance between active substrate 202 and upper substrate 211. Typical uniform gap spacers are made of organic material, such as polyimide, which is produced by a photoresist process. First electrode layer 201, second electrode layer 207, common electrodes 213 and ferroelectric layer 206 can be formed by sputtering; CVD; PVD; evaporation methods; plating methods; spin-coating; printing methods, such as offset printing or screen printing, a roll-coat method, a cast film method, a dipping method, a coating method, a sol-gel method, a hydrolysis and precipitation method, a spray method, or an LB method and the like. A surface-activating agent or a compiling layer, such as a silane compiling agent or the like may be provided as an interface between ferroelectric layer 206 and substrate 202, electrode 201 and electrode 207 for increasing adhesion strength. Since active device 300 can be formed by spin-coating, it will have a uniform character and cross-section over a large surface area. Therefore, active matrix displays can display a uniform picture image over a larger area than heretofore possible.

It is not necessary to restrict the material for electrode layers 201, 207 and 213 of active device 200 and active matrix display device 220 to ITO and Cr. The electrodes may be formed from a conductive material including a different metal, a transparent electrode, e.g., $SnO_2$ or the like, a semiconductor, a silicide, a conductive macromolecule, a conductive paint, a superconducting material or the like. Similarly, the substrates 202 and 211 need not be limited to glass, but may be an inorganic material, such as ceramic, or an organic material, such as a plastic, an acryl resin, a vinyl fluoride, or the like. In particular, when a thin inorganic material or an organic material is used as an insulating substrate, a flexible liquid crystal panel can be provided.

Since a glass substrate or the like used as an insulating substrate has a thickness which does not have any relation to the device character of active device 200 of the invention, the thickness of the substrate can be arbitrarily selected. In other words, the substance can be made thick and strong or thin and light without affecting operation of the active element or display device.

The material used for the ferroelectric layer of an active device prepared in accordance with the invention is not restricted to a VDF and TrFE copolymer, but it may be other ferroelectric materials including: a perovskite type ferroelectric material, such as $BaTiO_3$, $PbTiO_3$, or $WO_3$; a Rochelle salt ferroelectric material, such as Rochelle Salt, heavy hydrogen Rochelle Salt, tartrate, an alkali dihydrogen phosphate ferroelectric material such as KDP, orthophosphate, sodium arsenate, potassium dihydrogen phosphate, or potassium dideuterium phosphate; a guanidine ferroelectric material, such as GASH or TGS; an amorphous ferroelectric material, such as niobic acid kalium, glycin sulfate, ammonium sulfate, sodium nitrite, ferrocyanic acid kalium (yellow prussiate of potash), antimony sulfide iodide, $LiNbO_3$, $LiTaO_3$ or $PbTiO_3$; a macromolecule ferroelectric material, such as vinylidene fluoride and its copolymer, a copolymer of VDF and TeFE (tetrafluroethylene) or the like, a copolymer of cyanitation vinylidene and vinyl acetate, and a copolymer of VDF and TrFE and the like, or $Bi_4Ti_3O_{12}$, or Fe—B—O, or electret as a single crystal or a non-single crystal.

In addition to these materials, a compound of two or more types of ferroelectrics, or a compound of paraelectric materials and ferroelectric materials may be used. An inorganic ferroelectric material, for example $BaTiO_3$ has the advantage that it has a large remanent polarization and provides quick switching speed. An amorphous ferroelectric material has the advantage that a uniform ferroelectric layer can be easily obtained over a large area substrate. An organic ferroelectric material has the advantage that a uniform ferroelectric layer can be obtained on a large area substrate at low cost, because it can be deposited by spin-coating. Most ferroelectric materials have stable temperature characteristics because there is almost no change in dielectric constants and remanent polarizations at actual operating temperature. A ferroelectric material formed of an organic material with an inorganic ferroelectric powder dispersed therein may also be used.

FIGS. 8a–8d show an equivalent circuit for one pixel of the active matrix display shown in FIG. 7. One pixel represents the segment of liquid crystal panel 210 shown in FIG. 6. The capacitance of ferroelectric layer 206 forms an active area connected in series to liquid crystal material 212. The equivalent circuit is helpful to explain the basic operational principles of each pixel.

Figure 8A:
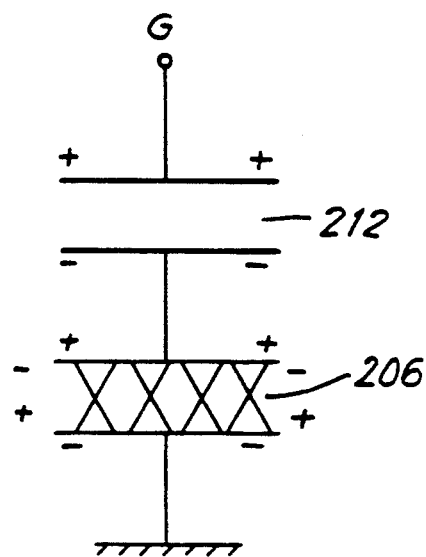
FIGS. 8a, 8b, 8c and 8d are equivalent circuits per pixel of the active matrix display illustrated in FIG. 7 explaining pixel operations.
Figure 8B:
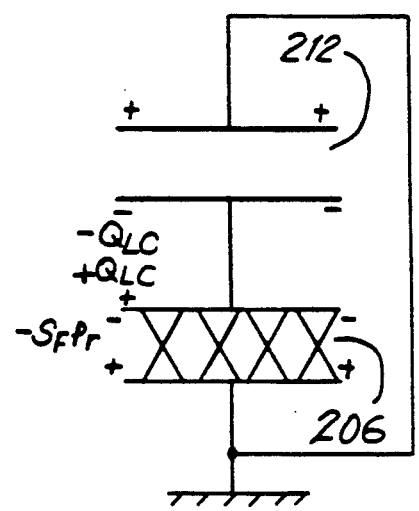

FIG. 8a illustrates the condition where a positive voltage sufficient to invert the spontaneous polarization in the ferroelectric layer is applied to a terminal G in a selection period so that substantially all of the spontaneous polarization is directed downwardly. As described above, the writing operation is completed by arranging the spontaneous polarization in a certain direction. Terminal G is then held at a ground potential as shown in FIG. 8b, a holding state. In other words, it is a non-selection period.

In the holding state, the ferroelectric layer has $-S_F \cdot P_r$ and a distribution amount of a free charge $Q_{LC}$ between the liquid crystal material and ferroelectric layer wherein $S_F$ is an active area of ferroelectric material, such as region $\beta$ in FIG. 3 and $P_r$ is the remanent polarization in the ferroelectric layer. Remanent polarization means the surface charge having a memory property held on the surface of the ferroelectric layer by the spontaneous polarization even after a voltage applied to the ferroelectric layer is interrupted. The liquid crystal material has the property $Q_{LC} = -C_{LC} V_{LC}$. In addition, since voltages $V_F$ and $V_{LC}$ applied to the ferroelectric layer and the liquid crystal material are equal, $$Q_F = -S_F P_r + Q_{LC} = C_F V_F \qquad (1)$$

$$Q_{LC} = -C_{LC} V_{LC} \qquad (2)$$

$$V_F = V_{LC} \qquad (3)$$

wherein
$Q_{LC}$: charge amount of liquid crystal material
$C_{LC}$: capacitance of liquid crystal material
$Q_F$: charge amount of ferroelectric layer
$C_F$: capacitance of the active layer in ferroelectric layer From equations (1), (2), (3) it is possible to derive the following:

$$V_F = V_{LC} = -S_F P_r / (C_F + C_{LC}) \qquad (4)$$

$$Q_{LC} = -C_{LC} S_F P_r / (C_F + C_{LC}) \qquad (5)$$

$$Q_F = -C_F S_F P_r / (C_F + C_{LC}) \qquad (6)$$

As described above, a voltage $V_F$ shown by equation (4) is held in liquid crystal material during a non-selection period.

Since it is known from equation (4) that the voltage $V_{LC}$ applied to the liquid crystal material is proportional to $P_r$, increasing $P_r$ in ferroelectric layer by a polling processing results in an active device having a large writing capability in the liquid crystal material. In addition, since it is known that $P_r$ has a memory property there is no current leakage caused by the ferroelectric layer. Good holding characteristic of $V_{LC}$ is provided in the active devices prepared in accordance with the invention. An active device with a large writing capacity with reduced current leakage provides a clear picture image with a sharp contrast.

Figure 8C:
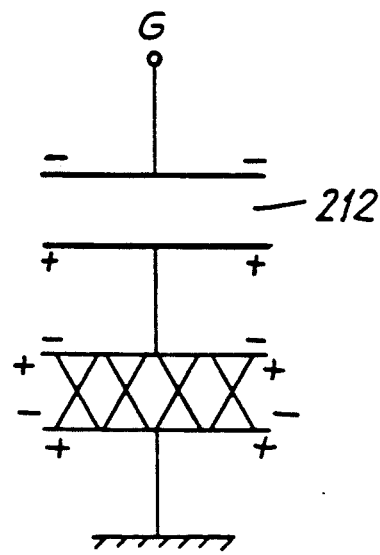
Figure 8D:
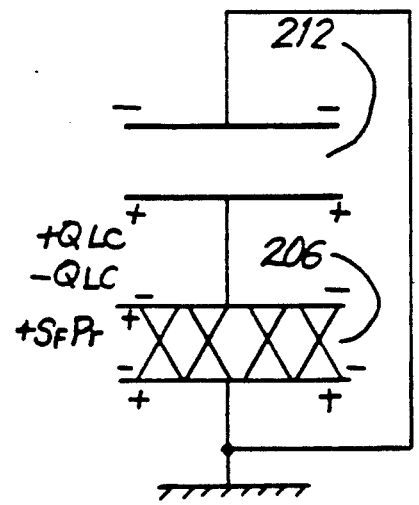

FIG. 8c shows a negative voltage applied to terminal G in the next field. The spontaneous polarization is inverted and directed upwardly. FIG. 8b then illustrates the spontaneous polarization held in a non-selection period after the period shown in FIG. 8c so that a voltage and a charge with an inverted polarity in equations (4), (5), (6) is applied to the liquid crystal material and the ferroelectric layer and is held therein.

Equation (4) also indicates that $V_{LC}$ can be controlled by the value of $P_r$ which is controlled by the magnitude of $\pm V_G$. In particular, when the ferroelectric layer is a non-single crystal ferroelectric material, especially one having a polycrystalline or amorphous structure, $P_r$ can be controlled easily.

In an actual active matrix display, a data voltage $\pm V_1$ is applied to terminal G in FIG. 8 during a non-selection period. A distributed potential of $\pm(C_F/(C_{LC}+C_F)) \cdot V_1$ that is noise is applied to the liquid crystal material. In order to reduce the noise to a low level, $C_{LC}/C_F$ is preferably large, that is $C_{LC}/C_F$ is preferably at least 1 or more and if possible, 10 or more.

A voltage $\pm(C_{LC}/(C_{LC}+C_F)) \cdot V_G$ is applied to the ferroelectric layer during a selection period. This voltage must be sufficient to invert the spontaneous polarization in the selection period. The larger value of $C_{LC}/C_F$ provides the larger voltage which is used to invert the spontaneous polarization. The value of $C_{LC}/C_F$ is preferably large, at least 1, and if possible, 10 or more.

Figure 9:
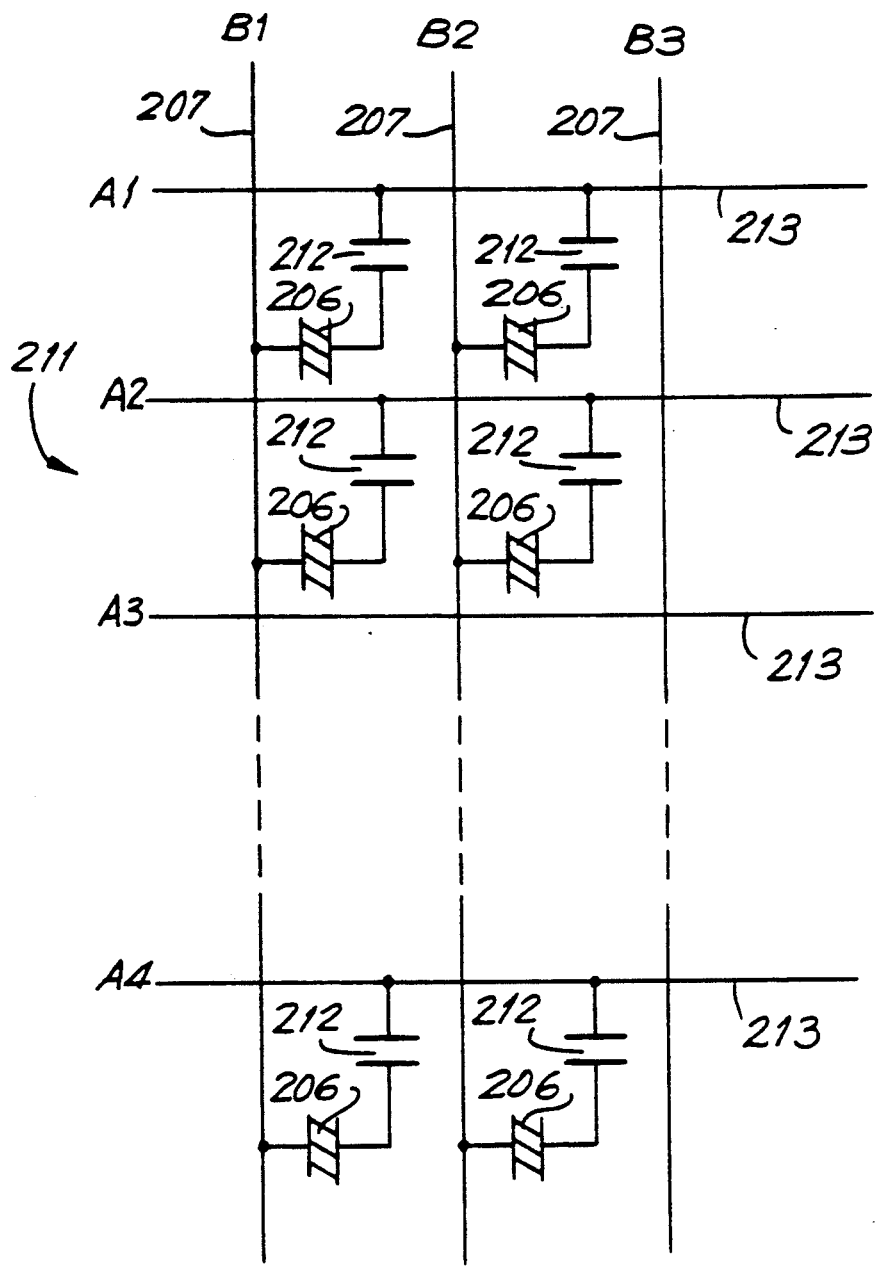
FIG. 9 is an equivalent circuit of the active matrix display of FIG. 7.

FIG. 9 shows an equivalent circuit of active matrix display 221 for a display device including the active devices illustrated in FIG. 7. Common line electrodes 213 on upper substrate 211 are represented by a group of selection lines A1, A2, A3, A4 and line electrodes formed by second electrode layer 207 on substrate 202 are represented by a plurality of data lines B1, B2 and B3. Corresponding pixels are formed by the series connection of the capacitors formed by liquid crystal material 212 and the active regions β of ferroelectric layer 206. In this case, common electrode 213 may be considered as a plurality of data lines and line electrodes 207 may be considered as a plurality of selection lines.

Figure 10:
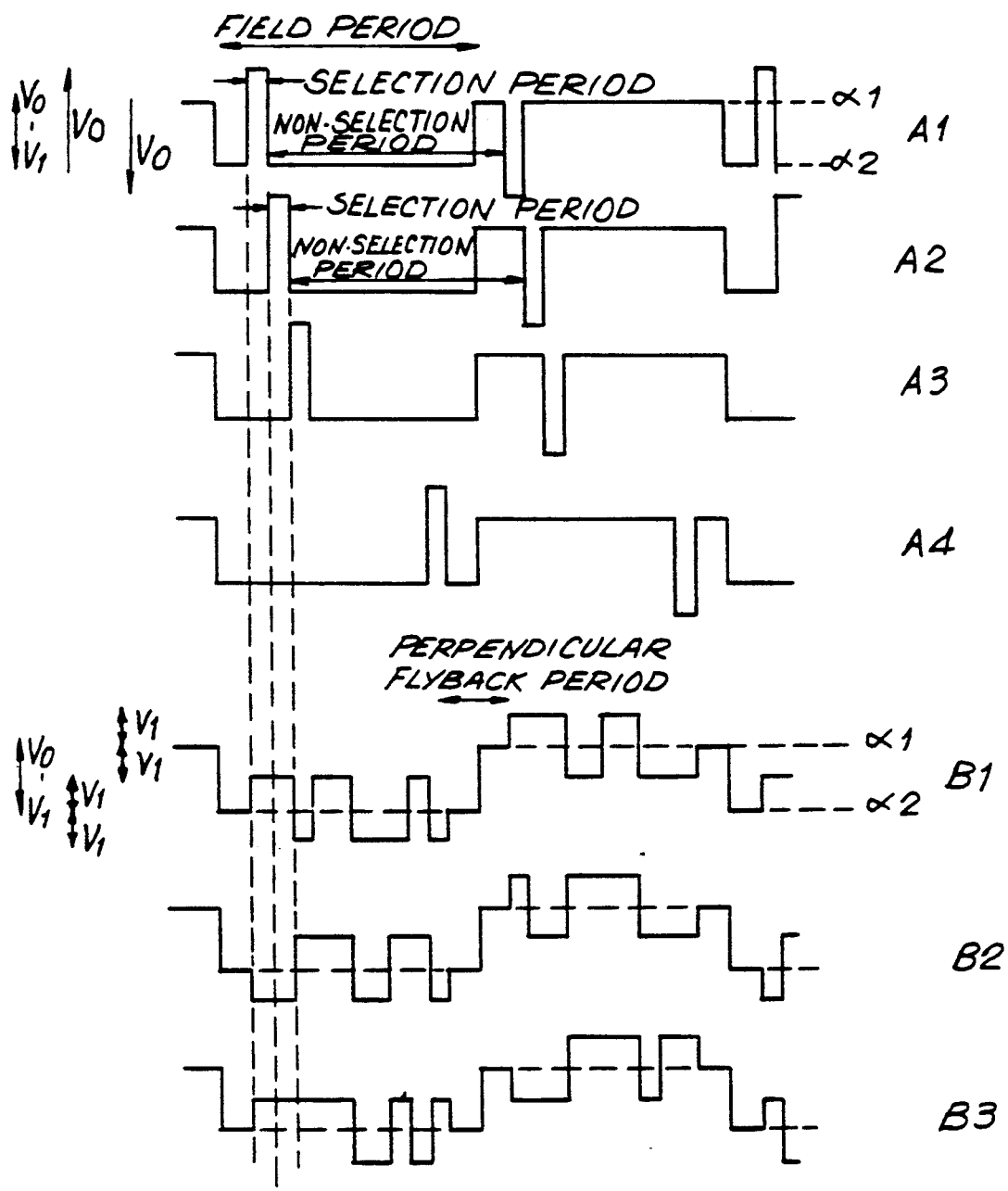
FIG. 10 illustrates the driving method for the active matrix display illustrated in FIG. 9.

FIG. 10 illustrates a driving method for the equivalent circuit of an active matrix display 220 shown in FIG. 9. Wave forms A1, A2, A3 and A4 in FIG. 10 refer to the waveform applied to selection lines A1, A2, A3 and A4 of FIG. 9 and data line. B1, B2 and B3 in FIG. 10 correspond to the same lines in FIG. 9, respectively. Pixels are selected horizontally by application of voltages as in waveforms A1, A2, A3 and A4 and a selection voltage $V_0$ is applied sequentially. A data voltage is applied to the respective pixels along data lines B1, B2 and B3. $V_0$ denotes a selection voltage and $V_1$ denotes a data voltage. If $C_{LC} >> C_F$, almost all of the voltage applied between the selection lines and the data lines is applied to ferroelectric layers 206.

The following events occur when A1 is selected in a field period. The following voltages are applied to the series connections between ferroelectric layers 206 and liquid crystal material 212 corresponding to the ON and OFF condition of liquid crystals 212 in the voltage.

$V(ON) = V_0 + V_1$ $V(OFF) = V_0 - V_1$

The following voltage is applied to the series connections in the non-selection period.

$V(non\text{-}selection) = \pm V_1$

In the non-selection period V (ON) and V (OFF) have the following relationships with respect to $E_0$ and $E_C$ in FIG. 4.

$V(ON) \geq d_F E_0$ $V(OFF) = d_F E_c$ where $d_F$ represents the film thickness of ferroelectric layer 206 and $E_c$ represents the coercive electric field of ferroelectric layer 206. In the non-selection period, the spontaneous polarization of ferroelectric layers 206 applied V (ON) or V (OFF) are in the state as shown in FIGS. 5a and 5c, respectively, wherein voltages corresponding to the respective remanent polarizations are applied to liquid crystal material 212 placing liquid crystal material 212 in the ON and OFF state.

When the selection period of A1 is completed, selection is performed successively in the order of A2, A3 and A4. V (On) or V (Off) is applied to liquid crystal 212 in the respective pixels. When the selection period is completed, a non-selection period is entered.

When A1 is selected again after the one writing or field period, the following voltages are applied to the series connections corresponding to ON and OFF.

$V(ON) = -V_0 - V_1 \leq -d_F E_o$ $V(OFF) = -V_0 + V_1 = d_F E_c$

Figure 5B:
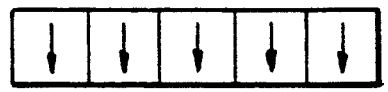
Figure 5C:

In the nonselection period the following voltage is applied to the series connections:

At this time the spontaneous polarizations of ferroelectric layers 206 to which are applied V (ON) or V (OFF) is as shown in FIGS. 5b and 5c. Voltages corresponding to the respective remanent polarizations are applied to liquid crystal material 212 and the liquid crystal material is placed in an ON or OFF condition so that an AC drive is performed in two field periods. In this case, it is not always necessary that V (OFF) is equal to $-d_F E_c$. V (OFF) may be other values of $-d_F E_c$ if the light transmission ratio of liquid crystal 12 does not vary greatly from the case where $-d_F E_c$ is applied. And $\pm V_1$ is applied to non-selected ferroelectric layer 206 in respective fields.

The voltages $V_0$ and $V_1$ are determined as follows in the method for driving an active matrix display in accordance with the invention. The driving method is shown in FIG. 10. Since the inverting speed of the spontaneous polarizations strongly depends on the electric field, if the inverting speed is too slow to invert the spontaneous polarization in the selection period, the display operation is difficult. For example, because the inverting speed is less than field period 16.7 m/sec, the operation of active matrix display 220 is difficult using coercive electric field. In this case, the voltage $V_0$ and $V_1$, are determined as described below.

Figure 11:
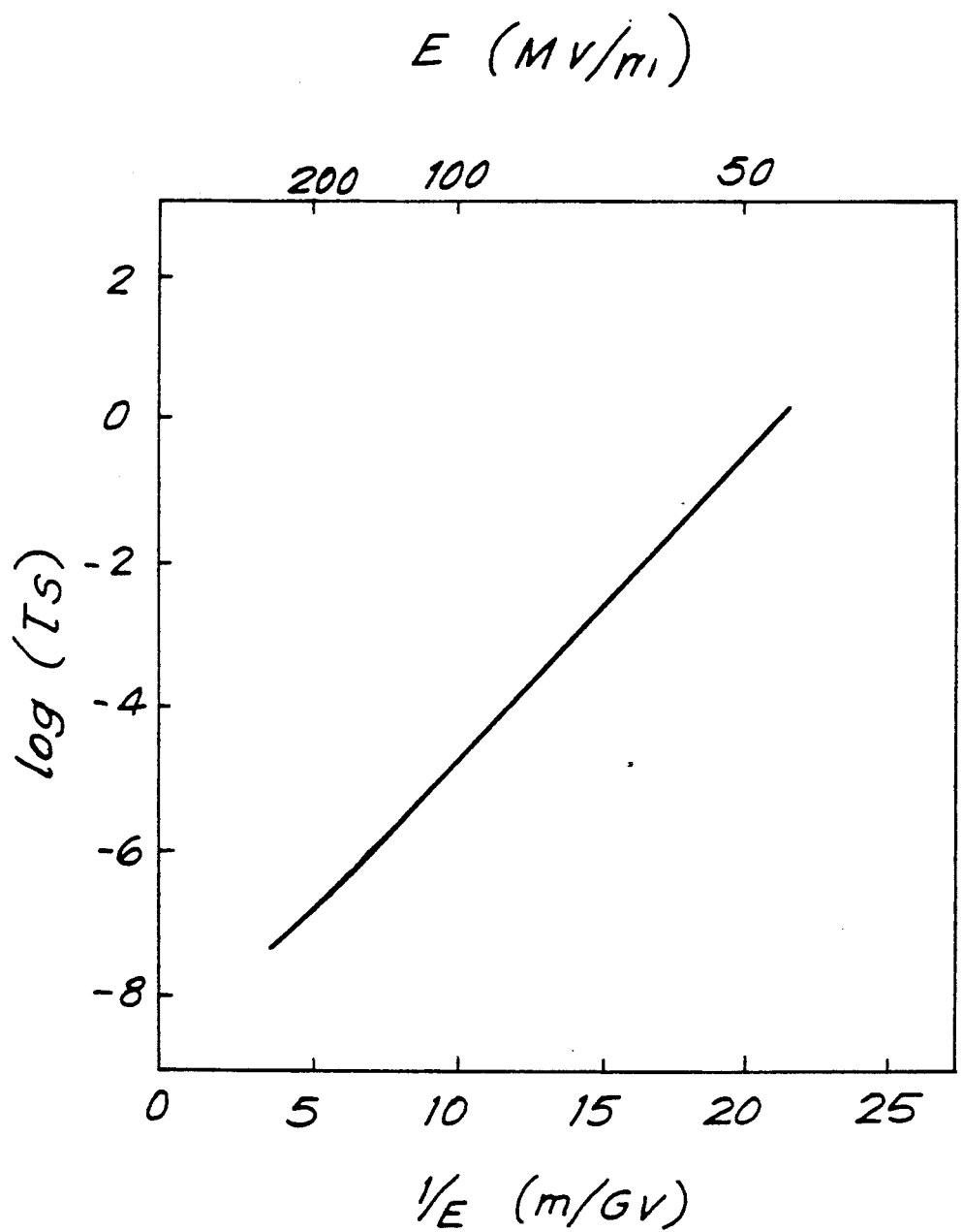
FIG. 11 illustrates the relationship between inverting speed of the spontaneous polarization of a ferroelectric layer composed of a copolymer of VDF and TrFE and electric field intensity.
Figure 12:
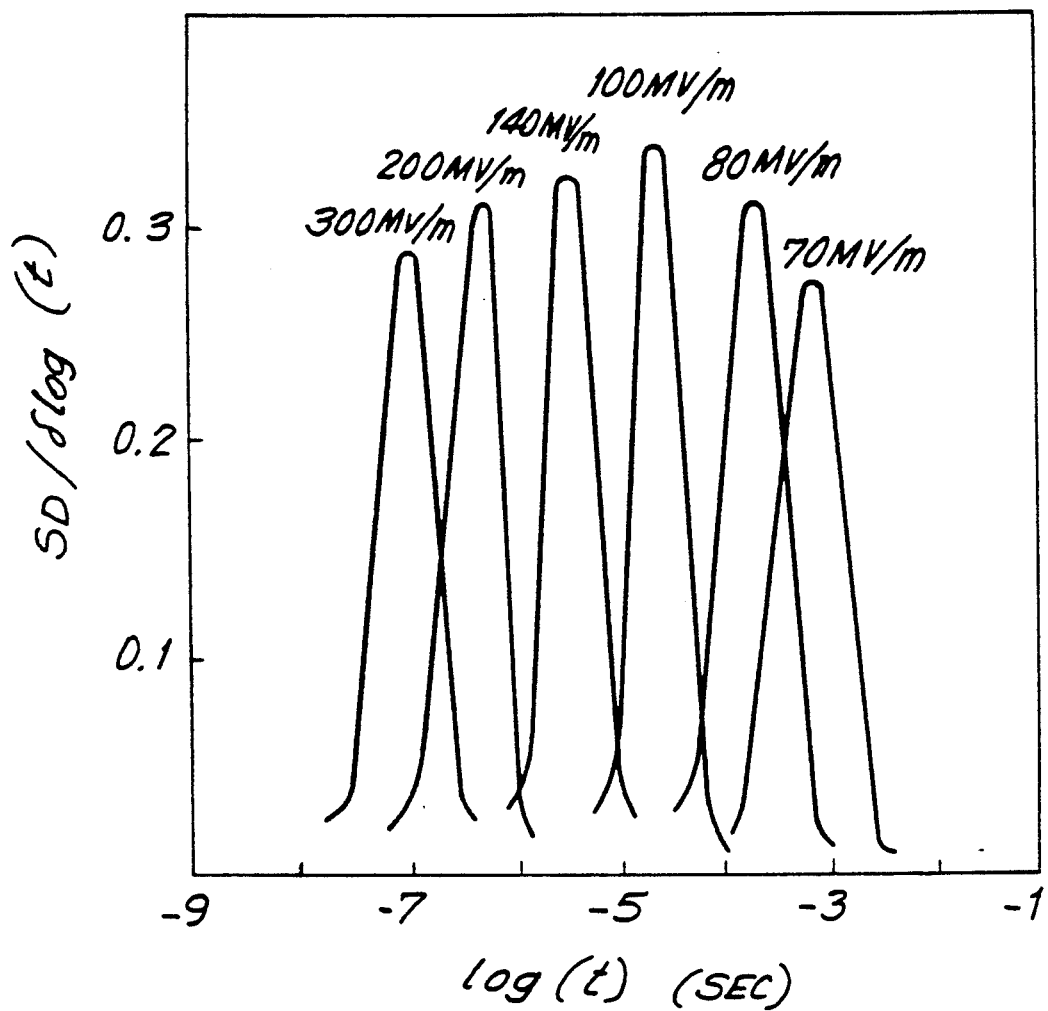
FIG. 12 illustrates the relationship between log (t) and $\delta D/\delta \log (t)$ of the copolymer of VDF and TrFE.

FIG. 11 shows that an inverting speed $\tau s$ of the spontaneous polarizations of a VDF and TrFe copolymer strongly depends on an electric field applied to the copolymer. The coercive electric field ($\sim$50 MV/m) has $\tau s$ of 1 sec. FIG. 12 shows the change in time of an electric displacement D in the copolymer, which is dependent on a electric field intensity. In FIG. 12, peaks of $\delta D/\delta \log (t)$ show that approximately one-half of the spontaneous polarizations are inverted at the times of the peaks. The times corresponding to the lower tails on the right sides of the respective peaks show that the spontaneous polarizations are substantially perfectly inverted at these times. In this case, the voltage V (OFF) may be determined so that the time length of the selection period coincides with the peak locations of the graph of $\delta D/\delta \log (t)$ and the voltage V (ON) may be determined so that a time length of a selection period coincides with the lower tails on the right sides of the graph. More specifically, with the voltage V (ON) thus determined, almost all of the spontaneous polarizations are inverted within the selection period so that the voltage determined by equation (4) is applied to liquid crystal 212. In addition, since approximately half of the spontaneous polarizations are inverted in the case of voltage V (OFF), the value of $P_r$ in ferroelectric layer 14 is smaller than the value of $P_r$ in the ferroelectric layer determined by voltage V (ON) so that a voltage smaller than V (OFF) is applied to liquid crystal material 212. At this time, data can be erased even if only one-half of the spontaneous polarizations are inverted and it is not always necessary that V (OFF) coincide with the peaks of $\delta D/\delta \log (t)$.

The liquid crystal material is placed in an ON and OFF condition when the voltage applied to the ferroelectric layer is larger than $E_c \cdot d_F$ in either V (ON) or V (OFF). In other words when $$(C_{LC}/(C_{LC}+C_F))|V_0-V_1| > E_c \cdot d_F$$

is satisfied, where $E_c$ represents a coercive electric field of the ferroelectric layer and $d_F$ represents the film thickness.

A voltage $\pm V_1$ is applied to ferroelectric layer 206 during a holding period that is a non-selection period. The voltage $V_1$ may be selected from FIG. 11 and FIG. 12 not to occur during the inverting of the spontaneous polarization in one field period. More specifically, the inverting speed of the spontaneous polarizations may be slower than one field period.

Further, a gray scale can be displayed as follows. When data voltage $V_2$ less than data voltage $V_1$ is used, a voltage V (gray scale) for displaying the gray scale in the selection period satisfies the following conditions:

$$|V(\text{gray scale})| = |V_0+V_2| < |V(\text{ON})|$$

$$|V(\text{gray scale})| = |V_0+V_2| > |V(\text{OFF})|$$

FIG. 12 illustrates that the amount of inversion of the spontaneous polarizations in a selection period is less than the case of V (ON) and more than the case of V (OFF). Thus, the remanent polarizations $P_r$ takes on an intermediate value of $P_r$ when V (ON) and V (OFF) are applied. Since $V_{LC}$ is proportional to $P_r$, $V_{LC}$ corresponding to $P_r$ can be determined. Thus, a gray scale can be displayed and the gray scale will have as many numbers as the $V_2$ level which can be displayed.

Additionally, the gray scale can be displayed by applying both V (ON) and V (OFF) in the selection period, rather than applying any one of them and changing the time distribution for applying both voltages.

Furthermore, FIG. 10 shows that when common potentials $\alpha 1$ and $\alpha 2$ are changed by a value of $V_0-V_1$ for every field period, the maximum voltage is reduced to $V_0+V_1$. As a result, the maximum voltage can be lowered. Thus, an active matrix display using an inexpensive driving circuit can be provided because a special high voltage driving circuit is not necessary and inexpensive standard parts can be used for the driving circuit. In this case, it is not always necessary that the difference between the common voltages $\alpha 1$, $\alpha 2$ equal $V_0-V_1$.

Although common potentials $\alpha 1$ and $\alpha 2$ are changed in every field period in FIG. 10, they may be changed in every selection period or every plurality of selection periods so that active matrix display 220 has pixels with different polarities of voltages applied to liquid crystal material 212.

Figure 13:
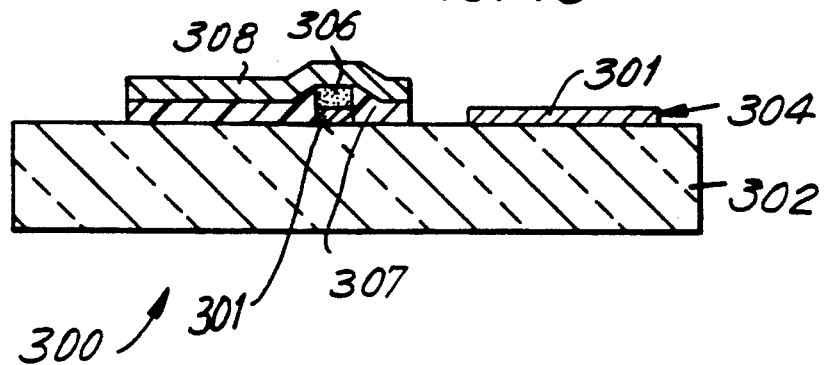
FIG. 13 is a cross-sectional view of an active device prepared in accordance with an alternative embodiment of the invention.
Figure 14:
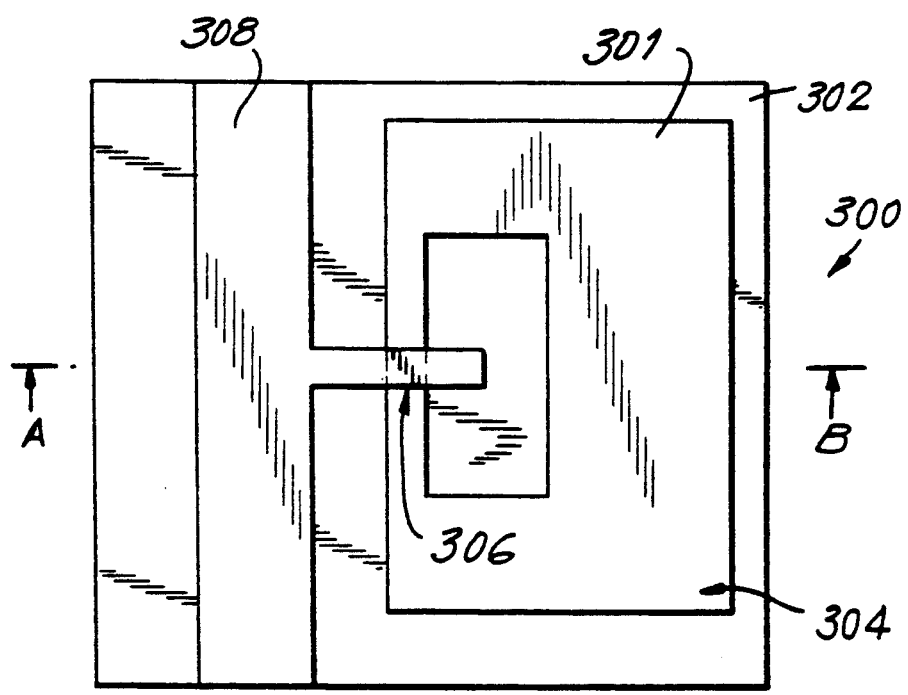
FIG. 14 is a plan view of the active device of FIG. 13.

FIGS. 13 and 14 show a configuration of an active device 300 constructed in accordance with the invention. FIG. 13 is a cross-sectional view taken along line A–B of the plan view in FIG. 14. A first ITO electrode layer 301 is deposited on an insulating substrate 302 of glass. Electrode layer 301 includes a display region 304 and an active region 306. A ferroelectric layer 307 of a VDF and TrFE copolymer and a second electrode layer 308 of Cr, are disposed on first electrode 301 in the same peripheral configuration when viewing the surface (i.e. plan view). Active region 306 of Ferroelectric layer 307 between first electrode layer 301 and second electrode layer 308 works as the active layer 306 of active device 300.

When an active matrix display as display 220 in FIG. 7 is fabricated by including active devices 300 as shown in FIGS. 3 and 14 in place of active devices 200 of FIGS. 2 and 3, several effects are produced. The pixel electrode formed from display region 304 of first electrode layer 301 is located in a region not in contact with ferroelectric layer 307. Since ferroelectric layer 307 having an electro-optical effect is not present on and under the pixel electrode display region 304, a change in the amount of transmitted light through an active matrix display including device 300 is determined only by the electro-optical effect of the liquid crystal material itself. Since the amount of the transmitted light is not affected by ferroelectric layer 307, a clear picture image with sharp contrast can be easily obtained.

FIGS. 15 and 16 show an active device 400 constructed in accordance with a third embodiment of the invention. FIG 15 is a cross-sectional view taken along line A–B of the plan view of FIG. 16. An island-shaped or isolated portion of ferroelectric material 401 of a VDF and TrFE copolymer is deposited on an insulation substrate 402 of glass. A first electrode layer 403 of Cr, and a second electrode layer 404 of ITO are deposited on substrate 402 and covering separate portions 401a and 401b of ferroelectric layer 401. In the embodiment of FIGS. 15 and 16, ferroelectric layer 401 connects ITO electrode 404 to Cr electrode 403. With this type of arrangement, where electrodes 403 and 404 do not overlap in plan view, a defect in ferroelectric layer 401 does not cause the two electrodes to short-circuit. Thus, a defect of active device 400 caused by a short-circuit, i.e., a defect in the pixels in the active matrix display, can be eliminated in principle. This provides a clear display with high quality.

Electrodes 403 and 404 may be deposited on insulating substrate 402 and an isolated or island of ferroelectric material 403 may be deposited on portions of both electrodes. When different materials are used for electrodes 403 and 404 as described above, three photoresist processing steps are required. However, when the same material is used for electrodes 403 and 404, active device 400 can be formed by two photoresist processing steps.

Since active device 400, shown in FIG. 16 is disposed in a parallel direction with respect to insulation substrate 402, ferroelectric layer 401 is thick and has a small capacitance. This is effective to drop the driving voltage, increase the inverting speed of spontaneous polarization and decrease the crosstalk effect. Thus, it has the effect of providing a clear picture image with sharp contrast.

Figure 17:
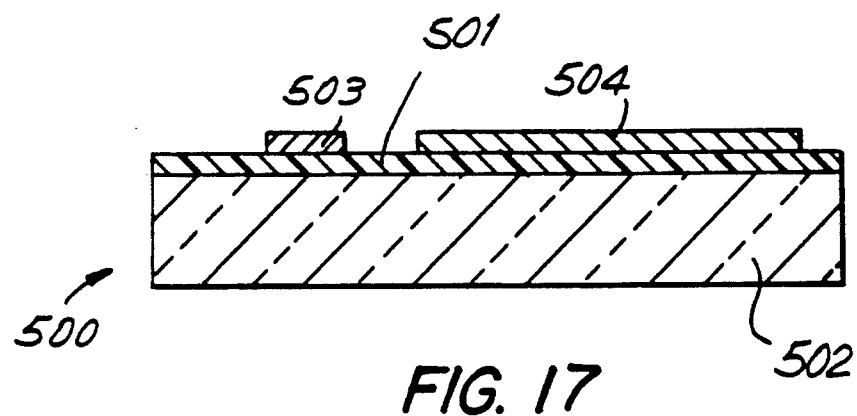
FIG. 17 is a cross-sectional view of a active device prepared in accordance with a further embodiment of the invention.
Figure 18:
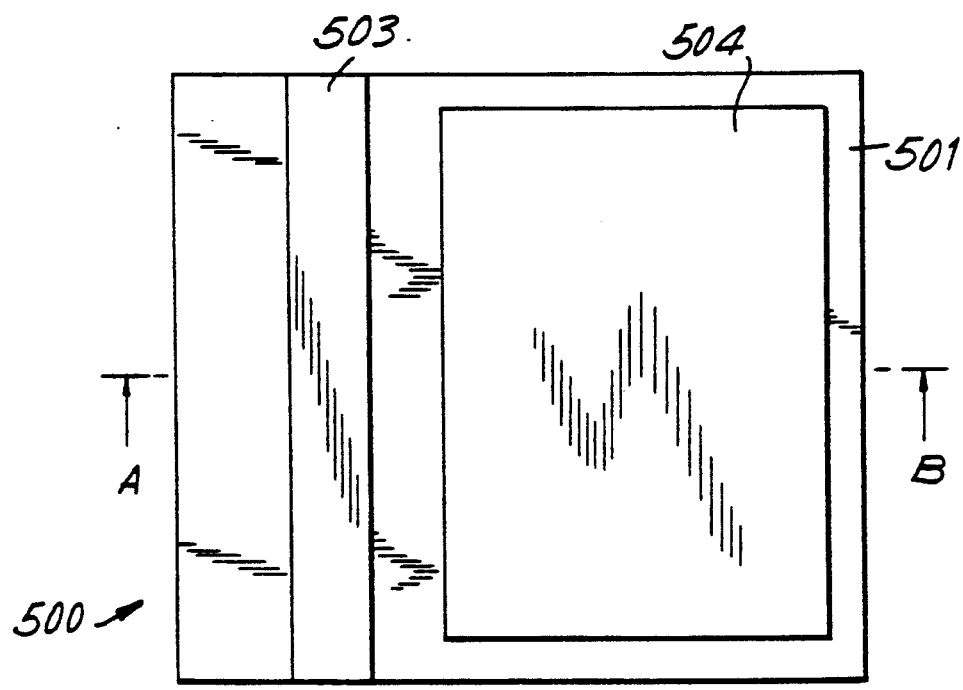
FIG. 18 is plan view of the active device of FIG. 17.

FIGS. 17 and 18 show a further arrangement of an active device 500 prepared in accordance with a further embodiment of the invention. FIG. 17 is a cross-sectional view taken along line A–B of the plan view of FIG. 18. A ferroelectric layer 501 of VDF and TrFE copolymer, is deposited on a glass insulating substrate 502. A first electrode layer 503 of Cr and a second electrode layer 504 of ITO are deposited on ferroelectric layer 501. Electrode layer 504 functions as the display region and electrode layer 503 is the electrode line with ferroelectric material 501 positioned between two electrodes 503 and 504 and serving as the active layer. In FIGS. 17 and 18, electrode 503 and electrode 504 may be formed directly on insulating substrate 502 and ferroelectric material 501 formed thereon.

Figure 19:
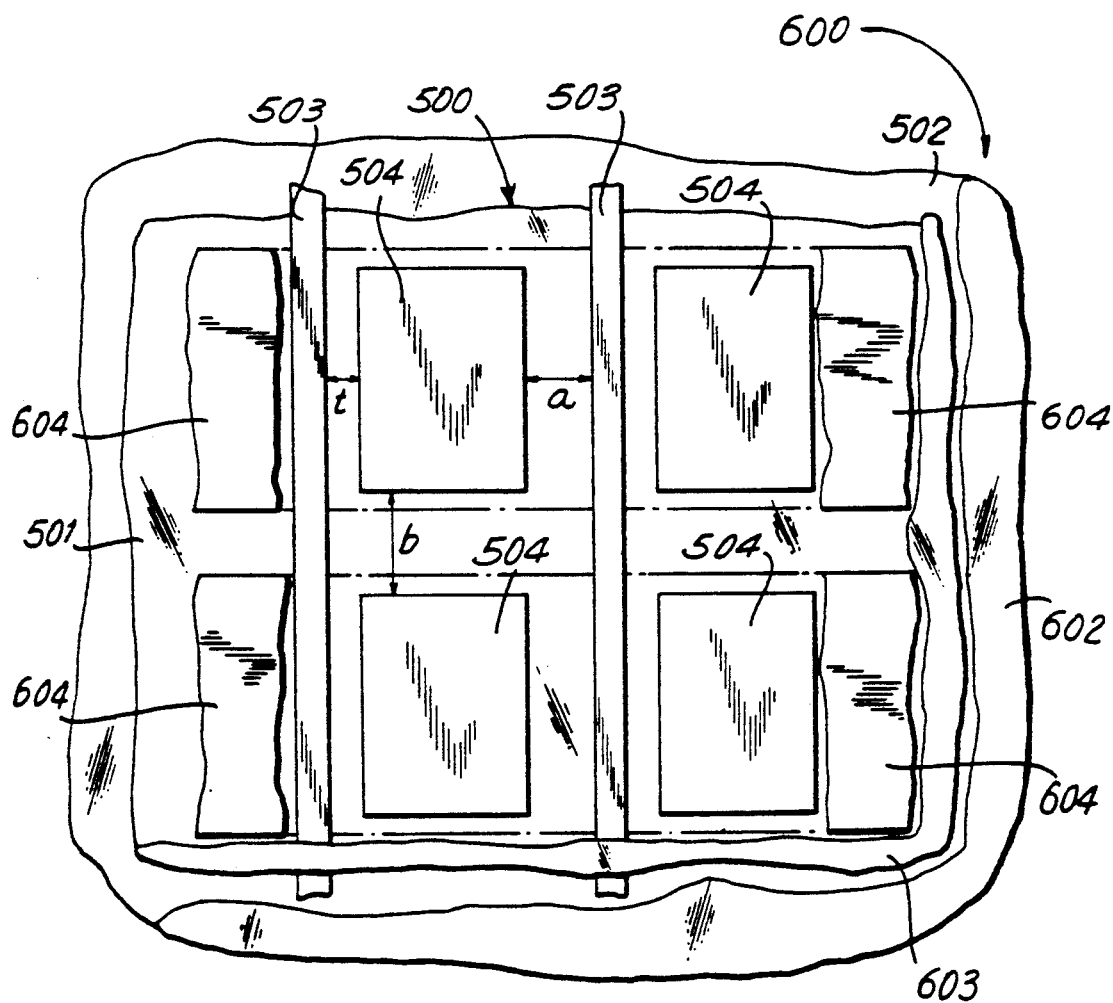
FIG. 19 is a plan view partially broken away showing a portion of an active matrix display including the active device illustrated in FIGS. 17 and 18.

FIG. 19 illustrates a plan view of a part of an active matrix display 600 having active devices 500 arranged in a matrix configuration on lower substrate 602. Active matrix display 600 includes a liquid crystal material held between substrate 602 with ferroelectric material disposed thereon as in element 500 of FIGS. 17 and 18 of a VDF and TrFE copolymer, line electrode 503 Cr and display electrode 504 of ITO, deposited on insulating substrate 602 and an opposed spaced apart substrate 603 having common electrodes 604 of ITO in confronting relationship with display electrodes 504 for forming a plurality of pixels. In FIG. 14, the dimensional relationships exist:

$$a > t$$

$$b > t$$

The dimensions a, b and t satisfy the conditions mentioned above and no inversion of spontaneous polarizations is caused in the a and b directions. Thus, no crosstalk occurs in horizontal and vertical directions.

Figure 20:
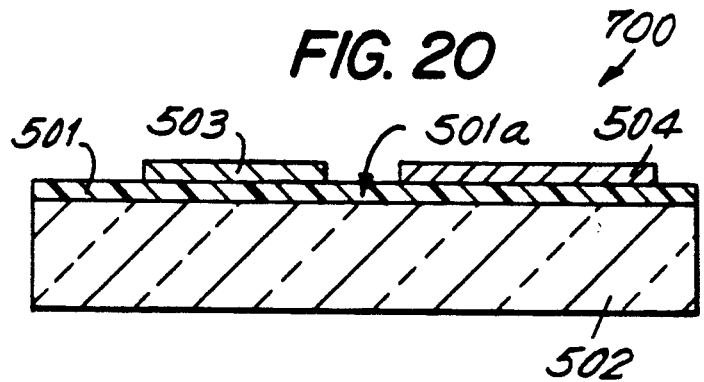
FIG. 20 is a cross-sectional view of an active device prepared by modifying the embodiment illustrated in FIGS. 17 and 18.
Figure 21:
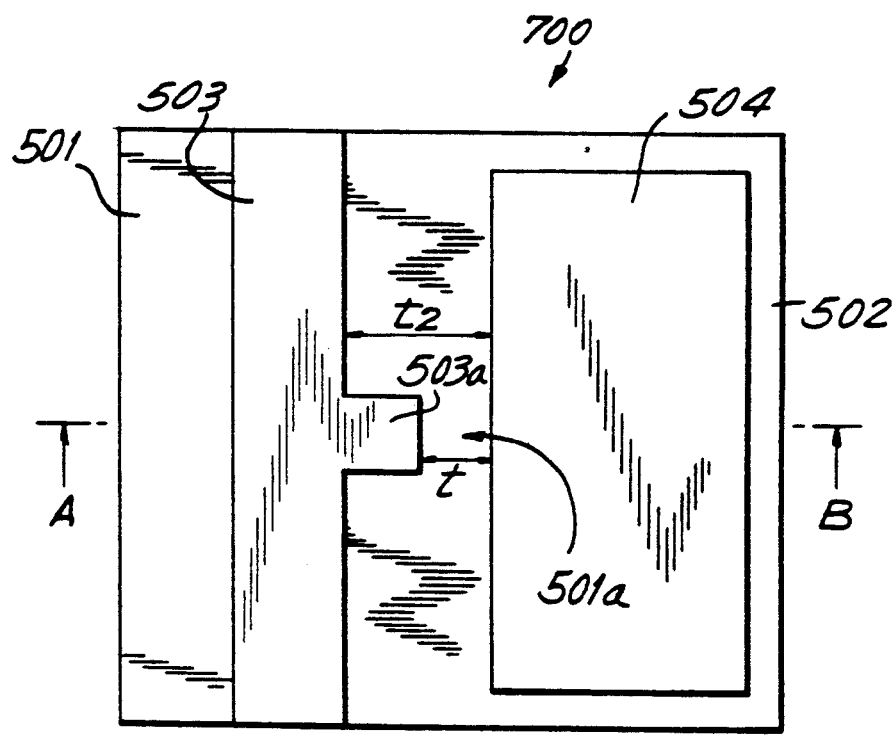
FIG. 21 is a plan view of the active device of FIG. 20.

FIGS. 20 and 21 show a modification of the configuration of active device 500 in accordance with this aspect of the invention. FIG. 20 is a cross-sectional view taken along line A–B of the plan view of FIG. 21. The basic arrangement and components of a active device 700 shown in FIGS. 20 and 21 are the same as active device 600 shown in FIGS. 17 and 18, except that a projection 503a of first electrode layer 503 extends toward display electrode 504. Ferroelectric material 501a between projection 503a of electrode line 503 and display electrode 504 functions as an active layer of active device 700. Dimensions t and $t_2$ between electrode line 503 and display electrode 504 are dimensioned so that the relationship $t_2 > t$ exists. Therefore, the capacitance of ferroelectric layer 501 is less than in the arrangement shown in FIGS. 17 and 18 where all ferroelectric material between the separate electrodes functions as an active layer of the active element.

The materials used and the method of forming the active devices in accordance with the several embodiments of the invention are the same as those used to form first electrode layer 204, second electrode layer 207, insulating substrate 202, ferroelectric layer 206 and active device 200 of FIGS. 2 and 3.

Any one of active devices 300, 400, 500 and 700 of the later embodiments may be used in place of active device 200 for forming liquid crystal panel 210 and active matrix display 220, shown in FIGS. 6 and 7. Likewise, the film thickness of ferroelectric material ma be thicker than the film thickness of one of the electrode layers disposed between the insulating substrate and the ferroelectric material.

The advantages of devices prepared in accordance with the invention are as follows:

(1) Active devices 200 and 300 prepared in accordance with the invention have relatively large capacitances because they have a thin film thickness dependent on the film thickness of the ferroelectric layer and a large electric field is applied to the ferroelectric layer. As a result, the active devices are particularly effective when an organic ferroelectric material with a large coercive electric field and a small relative dielectric constant is used as the ferroelectric material.

Active devices 400, 500 and 700 prepared in accordance with the invention have small capacitances because they use the dimension of ferroelectric material in the surface direction of insulating substrate 402 represents the thickness and a large electric field is difficult to apply. As a result, these active devices are effective when inorganic ferroelectric materials, which have large dielectric constants and small coercive electric fields, are used in thin ferroelectric layers.

The driving method used to drive active matrix display 220 applies to the active matrix display constructed including active devices such as active devices 300, 400, 500 or 700 in accordance with the invention.

FIG. 22 is a plan view of a liquid crystal display panel 800 including an active pixel 801 arranged in accordance with another embodiment of the invention. FIG. 23 is a cross-sectional view taken along line A–B of FIG. 22 and shows the arrangement of elements on an active insulating substrate 802 of glass and an opposed substrate 803. The region denoted γ on substrate 802 includes active devices 804 constructed in accordance with the first embodiment of the invention. The regions denoted include additional active devices 806 of equivalent capacitance formed by a dielectric between an additional or third electrode layer and the first electrode layer as will be described in more detail below. This configuration provides additional capacitors in series.

Liquid crystal panel 800 includes a liquid crystal material 807 in the space between substrates 802 and 803. An additional or third electrode layer 807 of A1 is selectively disposed on substrate 802. Third electrode layer includes a line electrode portion 807a and two projecting regions 807b and 807c. A dielectric layer 808 of a polyamide material is disposed on substrate 802 covering third electrode layer 807. A second electrode layer 809 of ITO is selectively deposited on dielectric layer 808. A ferroelectric layer 811 of a VDF and TrFE copolymer is deposited on second electrode layer 809 and a first electrode layer 812 of Cr is deposited on ferroelectric layer 811 in the form of a line orthogonal to line portion 807a of third electrode layer 807 and includes a projection 812a projecting towards pixel 801 and overlapping a portion of second electrode layer 809. Opposed substrate 803 includes a common electrode 813 of ITO, deposited thereon.

Capacitor 804 in γ region is formed by second electrode layer 809, ferroelectric layer 811 and first electrode layer 812. Additional capacitors 806 are formed by projecting regions 807b or 807c and third electrode layer 807, dielectric layer 808 and second electrode layer 809. Additional capacitance is connected in series. In this arrangement, common electrode 813 is kept at a constant voltage. Voltages $V_1$ and $V_0$ are applied to third electrode layer 807 and first electrode layer 812. Voltages $V_1$ and $V_0$ are applied in series to additional capacitors 806 including ferroelectric layer 811 of active device 800 to drive the pixel. The amount of charge held between second electrode 809 and common electrode 813 is determined to prove a suitable voltage to be applied to liquid crystal material 817.

With the arrangement shown in FIGS. 22 and 23, even if pin holes are formed in ferroelectric layer 811 or dielectric layer 808 forming capacitors 806 or additional capacitors 804, a substantially normal voltage can be applied to liquid crystal material 817. For example, when defects are caused to points P or Q in FIG. 22 due to pin holes, sections R and S in the drawing may be cut-off.

An electro-optical active matrix display is formed by arranging pixels 800 shown in FIG. 22 in a matrix configuration of columns and rows. The driving method for driving such an active matrix display in accordance with the invention as described above is used. The same voltage is applied to both line portions 804 of second electrode layer 812 at the same time. However, different voltages may be applied to detect the location of defects. When an active matrix display is formed by use of the liquid crystal panel as shown in FIG. 23 common electrode 813 may be flat or stripe-shaped as shown in connection with the embodiment of FIG. 7.

In summary, an active device prepared in accordance with the invention utilizes a ferroelectric layer as an active layer. The ferroelectric layer has a remanent polarization with a memory effect. There is no leakage current of the active device itself, and the voltage applied to the liquid crystal material is held without loss through the active device. This provides a clear picture image with sharp contrast.

(2) The ferroelectric layer, as an active layer may be formed by a simple spin-coat method. The film thickness and the film quality of the ferroelectric layer are uniform over a large area substrate. Thus, the active device has a uniform character over a large area substrate. As a result, the active device provides a picture image which is displayed uniformly over a large area substrate.

(3) Since only a small number of photoresist processing steps, i.e., one to three, are necessary for forming the active device in accordance with the invention and since the ferroelectric layer as an active layer is formed by the spin-coat method, the active device can be made at low cost with high yield.

(4) The active devices arranged in accordance with the invention have a ferroelectric layer disposed parallel to the upper surface of an insulating substrate. Thus, a short-circuit of the ferroelectric layer will not produce a defect in the active device and the active device will have a low capacitance.

(5) The ferroelectric layer of the active device in accordance with the invention may be formed by the spin-coat method and has a film thickness greater than the film thickness of an electrode between the ferroelectric layer and the insulating substrate. Thus, the active device has covered stepped portions. This results in an active device of excellent reliability and high yield.

(6) When the driving method for driving an active matrix display in accordance with the invention is used, an active matrix display having active devices with ferroelectric layers which invert the speed of spontaneous polarization in a time less than a selection period, 16.7 m/sec, a display operation can be provided. This is particularly true when organic ferroelectric materials are used as the ferroelectric layers.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A method of driving an active electro-optical matrix display device including a ferroelectric material layer, an electro-optical display material, a plurality of selection lines, a plurality of columns or rows of display electrodes and a plurality of data lines arranged substantially orthogonal to the selection lines, said display electrodes serving as picture elements arranged in a matrix pattern corresponding to the intersection of the selection lines and the data lines, said ferroelectric layer being disposed between one of the plurality of selection lines or the plurality of data lines and the display electrodes, the electro-optical display material being disposed between said ferroelectric material layer and one of the plurality of selection lines or the plurality of data lines on the one hand and the other of the plurality of selection lines or plurality of data lines o the other hand, comprising the steps of:

successively applying a selection voltage $\pm V_0$ to the respective selection lines during respective field periods; and applying a data voltage $\pm V_1$ to a selected group of data lines;

wherein the selection voltage $\pm V_0$ and the data voltage $\pm V_1$ are applied so that the absolute value $|V_0 - V_1|$ satisfies the relationship for all values of $\pm V_0$ and $\pm V_1$:

$$C_{LC}/(C_{LC}+C_F)|V_0-V_1| > E_c \cdot d_F$$

wherein:
$E_c$ is the coercive electric field of the ferroelectric layer;

$d_F$ is the film thickness of the ferroelectric material layer;

$C_F$ is the capacitance of the ferroelectric material for each display electrode; and $C_{LC}$ is the capacitance of the electro-optical display material for each display electrode.

2. The method of driving an active electro-optical matrix display device of claim 1, further including applying additional voltages to the ferroelectric layer and the electro-optical material layer during the non-selecting period.

3. The method of driving an active electro-optical matrix display device of claim 1, further including inverting the polarity of the selection voltage applied to each picture element during successive selecting periods for inverting the polarity of the charged surface density of the ferroelectric layer.

4. The method of driving an active electro-optical matrix display device of claim 1, wherein the electro-optical material is a liquid crystal material.

5. The method of driving an active electro-optical matrix display device of claim 1, wherein the selection voltage $\pm V_0$ is sequentially applied to the plurality of selection lines.

6. The method of driving an active electro-optical matrix display device of claim 1, wherein the selection lines include a plurality of projections, each projection for overlapping a portion of a display electrode.

7. The method of driving an active electro-optical matrix display device of claim 1, wherein the selection lines be essentially in the same plane as the display electrodes and ferroelectric material lies between the side edge of a selection line and the side edge of a display electrode.

8. A method of driving an active electro-optical matrix display device including an active device having at least a capacitance layer electrically connected in series to a ferroelectric layer, the device further including a stripe like pattern of electrodes arranged in a horizontal direction in descending order serving as selection lines and a stripe like pattern of electrodes arranged in a vertical pattern serving as data lines and picture elements arranged in a matrix pattern corresponding to where said selection lines and data lines cross over each other in order to write data applied to the data lines into each picture element associated with a selection line and comprising the steps of:

defining successive field periods for the operation of the device, each including a selecting period and non-selecting period;

determining the selecting period of each selection line based on the time required to sequentially select each selection line in descending scale;

applying predetermined voltages to both the ferroelectric layer and capacitance layer during the selecting period in order to invert the spontaneous polarization of a predetermined area of said ferroelectric layer and to form a surface charge density of the ferroelectric layer;

charging with a predetermined polarity the surface charge density of the predetermined area of the ferroelectric layer in response to applying the predetermined voltages to both the ferroelectric layer and the capacitance layer; and applying a voltage induced by the surface charge density of the ferroelectric layer to both the ferroelectric layer and the capacitance layer during the non-selecting period in proportion to the surface charge density of the ferroelectric layer;

wherein the capacitance layer is formed from an electro-optical material and said step of applying predetermined voltages to both the ferroelectric layer and the capacitance layer includes:

successively applying a selection voltage $\pm V_0$ to the respective selection lines during respective field periods; and applying a data voltage $\pm V_1$ to a selected group of data lines;

wherein the selection voltage $\pm V_0$ and the data voltage $\pm V_1$ are applied so that the absolute value $|V_0-V_1|$ satisfies the relationship for all values of $\pm V_0$ and $\pm V_1$;

$$C_{LC}/(C_{LC}+C_F)|V_0-V_1| > E_C d_F$$

wherein:

$E_C$ is the coercive electric field of the ferroelectric layer;

$d_F$ is the film thickness of the ferroelectric layer;

$C_F$ is the capacitance of the ferroelectric material for each display electrode; and $C_{LC}$ is the capacitance of the electro-optical material for each display electrode.

* * * * *